United States Patent [19]
Bornhorst, Jr.

[11] Patent Number: 5,493,939
[45] Date of Patent: Feb. 27, 1996

[54] UNIVERSAL CYLINDER MOUNT FOR USE IN AN ENGRAVER

[75] Inventor: Kenneth F. Bornhorst, Jr., Centerville, Ohio

[73] Assignee: Ohio Electronic Engravers, Inc., Dayton, Ohio

[21] Appl. No.: 95,100

[22] Filed: Jul. 21, 1993

[51] Int. Cl.[6] .................................................... B23B 23/04
[52] U.S. Cl. .............................. 82/150; 82/147; 82/148
[58] Field of Search ............................ 82/148, 150, 147, 82/166

[56] References Cited

U.S. PATENT DOCUMENTS

| | | | |
|---|---|---|---|
| 1,252,274 | 1/1918 | Lingo | 82/150 |
| 1,782,272 | 11/1930 | Power | 82/150 |
| 1,967,004 | 7/1934 | Braden | 82/150 |
| 2,514,970 | 7/1950 | Prickett | 82/150 |
| 3,057,238 | 10/1962 | Benes | 82/150 |
| 3,177,742 | 4/1965 | Basso | 82/150 |
| 3,756,102 | 9/1973 | Casey | 82/150 |
| 4,092,885 | 6/1978 | Kohori | 82/150 |

OTHER PUBLICATIONS

"Martin Galvanotechik Galvanoplastie Plating," R. G. Martin AG, CH–4106 Therwil, Erlenstrasse 50, Switzerland, undated brochure.

"Think Boomerang System", Rotogravure Cylinder Making System, Fujitoku Co, Tsukuba, Japan, undated brochure.

"Magnetic Antriebstechnik", Magnetic Ekektromotoren AG, PO Box 267, CH–4410 Liestal Switzerland, undated brochure.

"Valcus" Screen brochure, undated.

"Datwyler", Max Daetwyler Corporation, 13420 West Reese Blvd., Huntersville, NC 28078, undated brochure.

"Twin–Pilot", Maschinenfabrik Kaspar Walter GmbH & Co. KG, Plinganserstrasse 22, 8000 Munchen 70, Germany, undated brochure.

*Primary Examiner*—Bruce M. Kisliuk
*Assistant Examiner*—Eileen P. Morgan
*Attorney, Agent, or Firm*—Jacox, Meckstroth & Jenkins

[57] ABSTRACT

A universal cylinder mount for mounting a at least one of a plurality of cylinders between a headstock and a tailstock of an engraver. Each of the cylinders have a mounting aperture at each end adapted to receive a universal cylinder mount associated with each of the headstock and tailstock. The universal cylinder mount is adapted to accommodate a plurality of mounting apertures formed with different sizes and having various sloped walls for facilitating alignment and frictional gripping engagement of the cylinders.

37 Claims, 8 Drawing Sheets

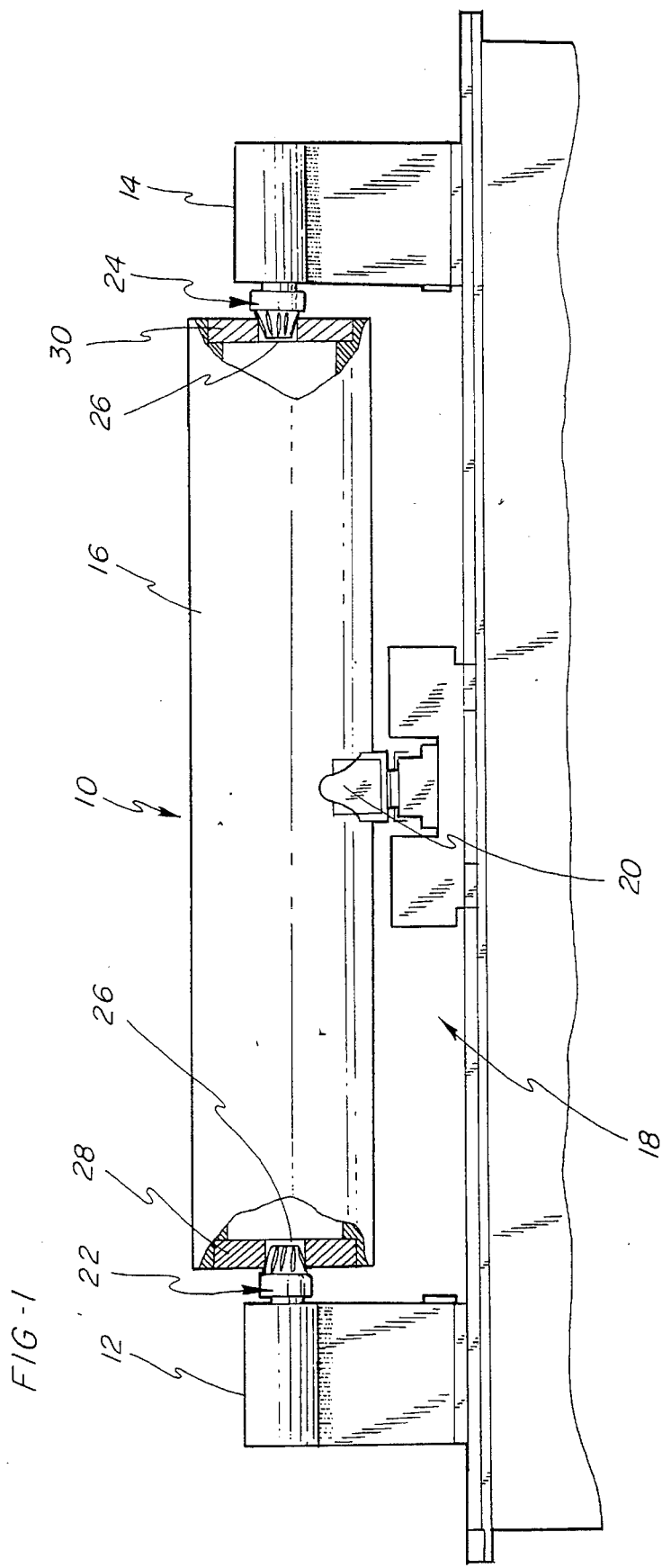

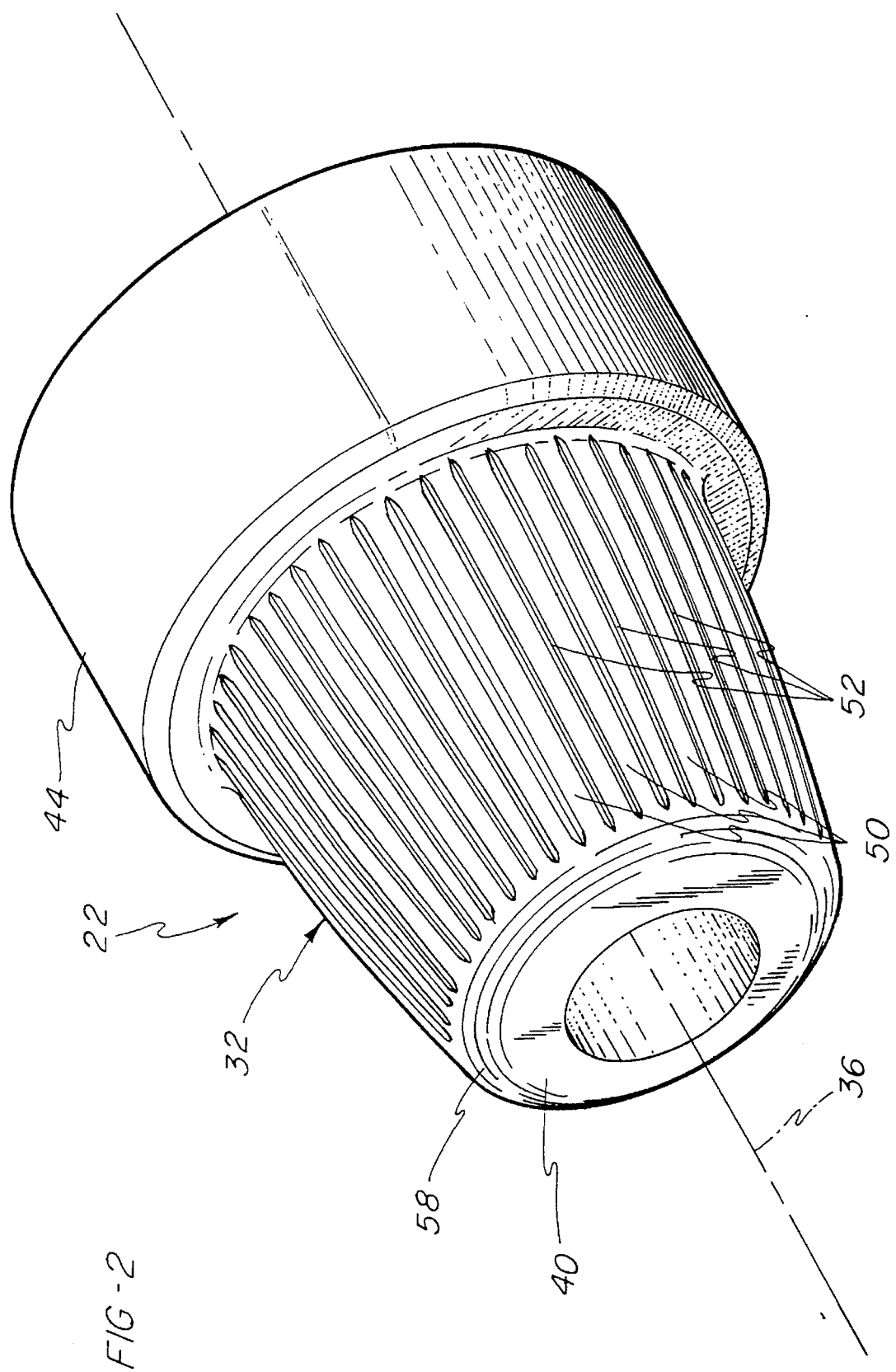

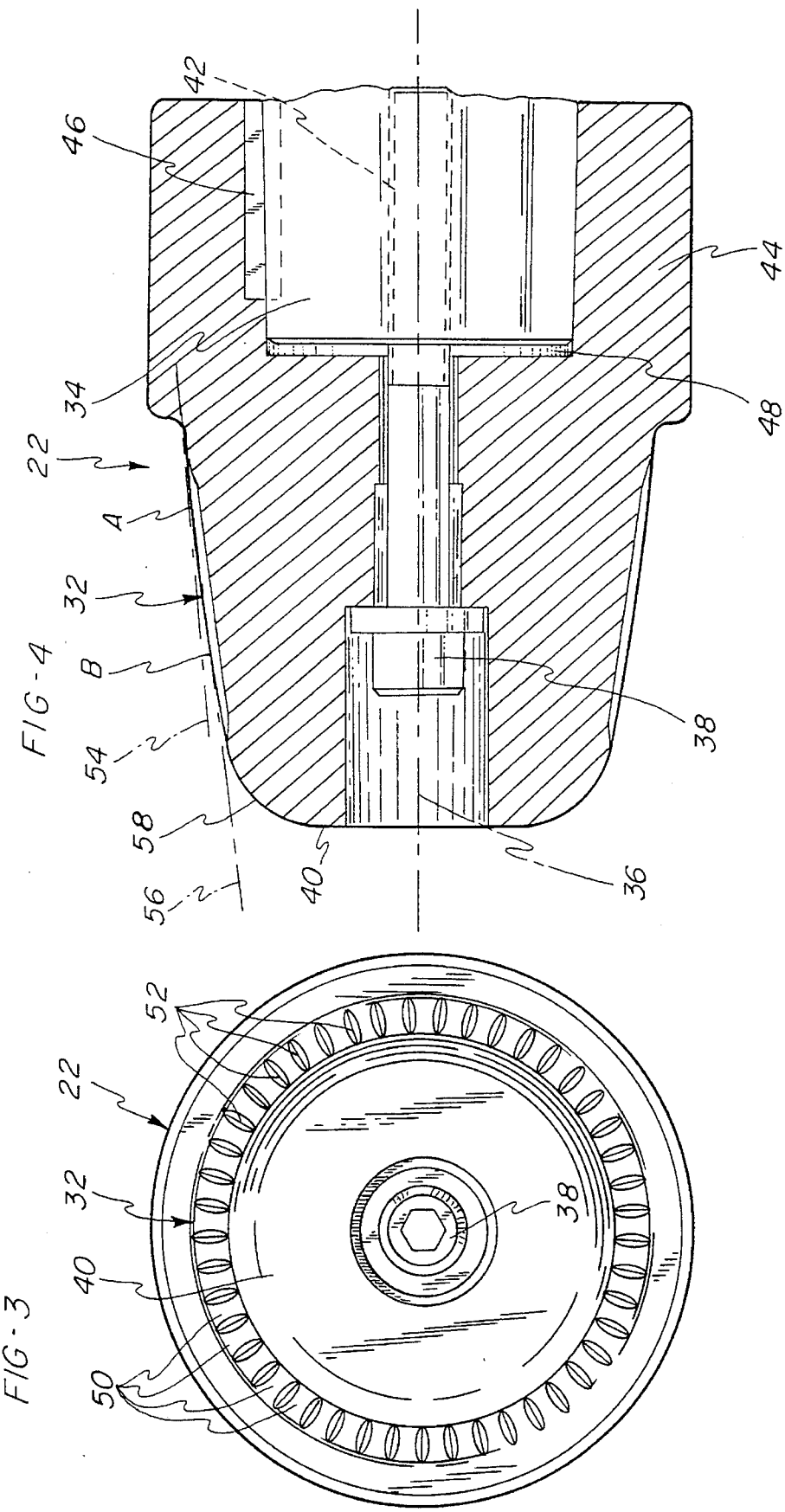

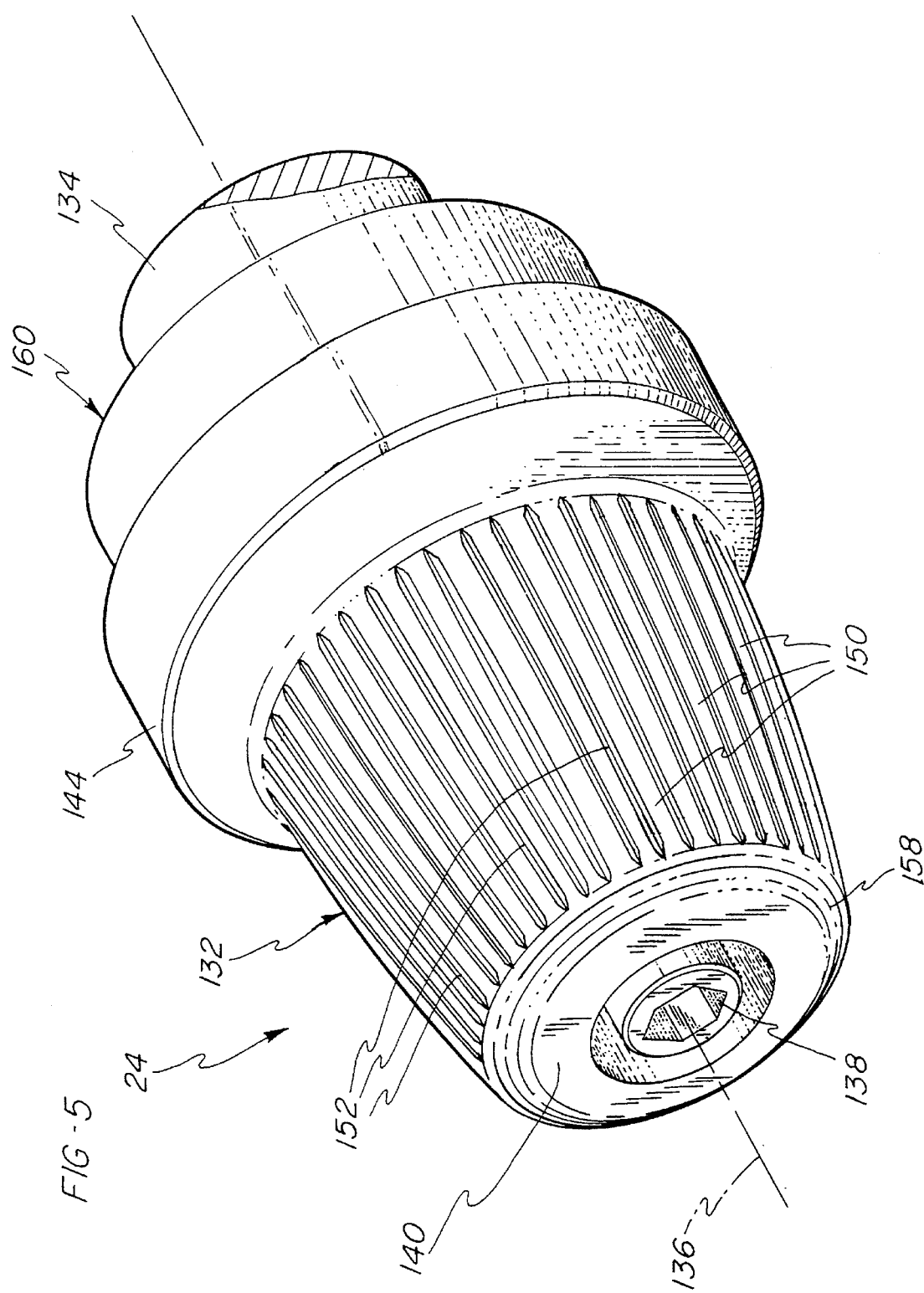

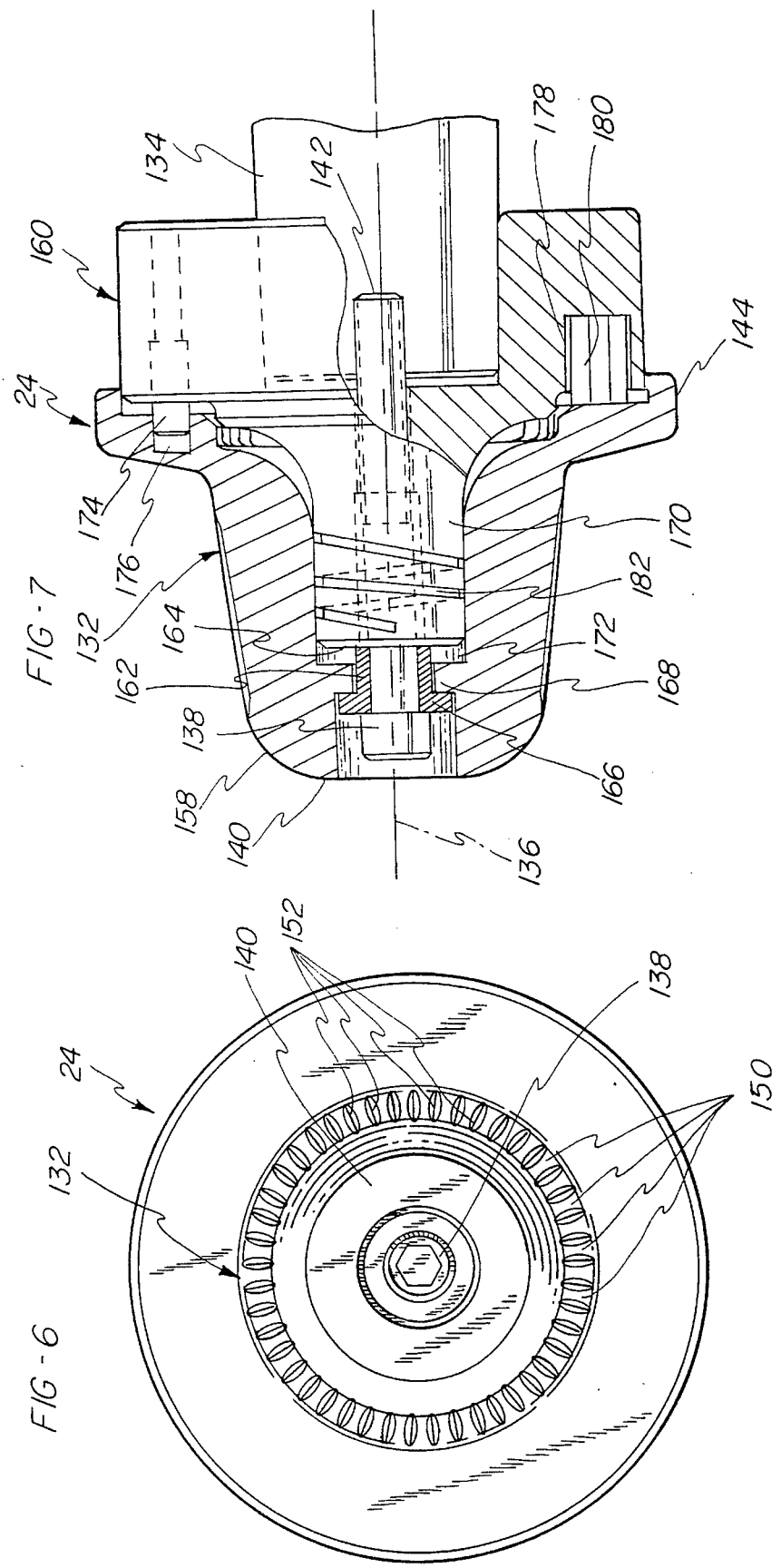

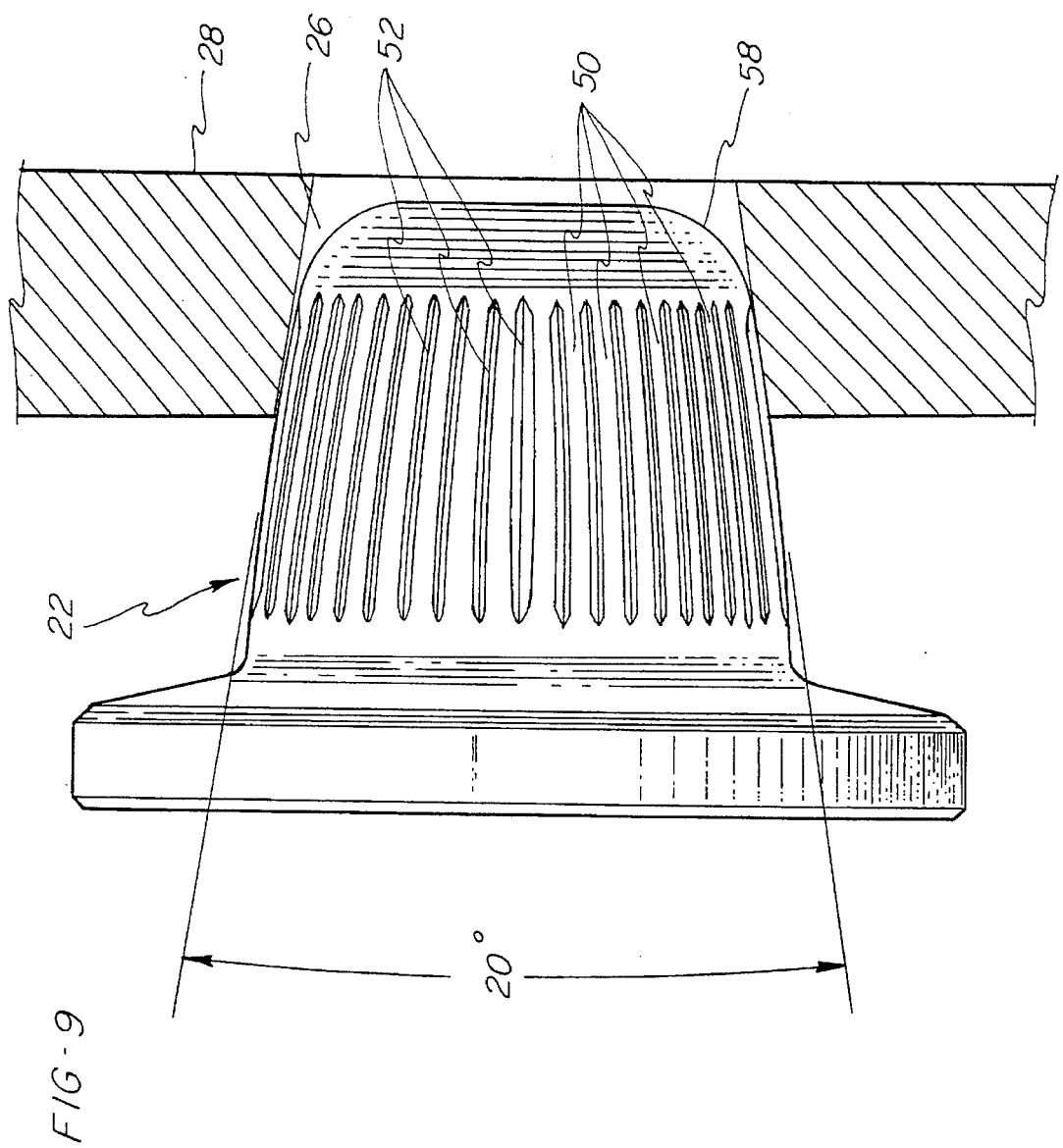

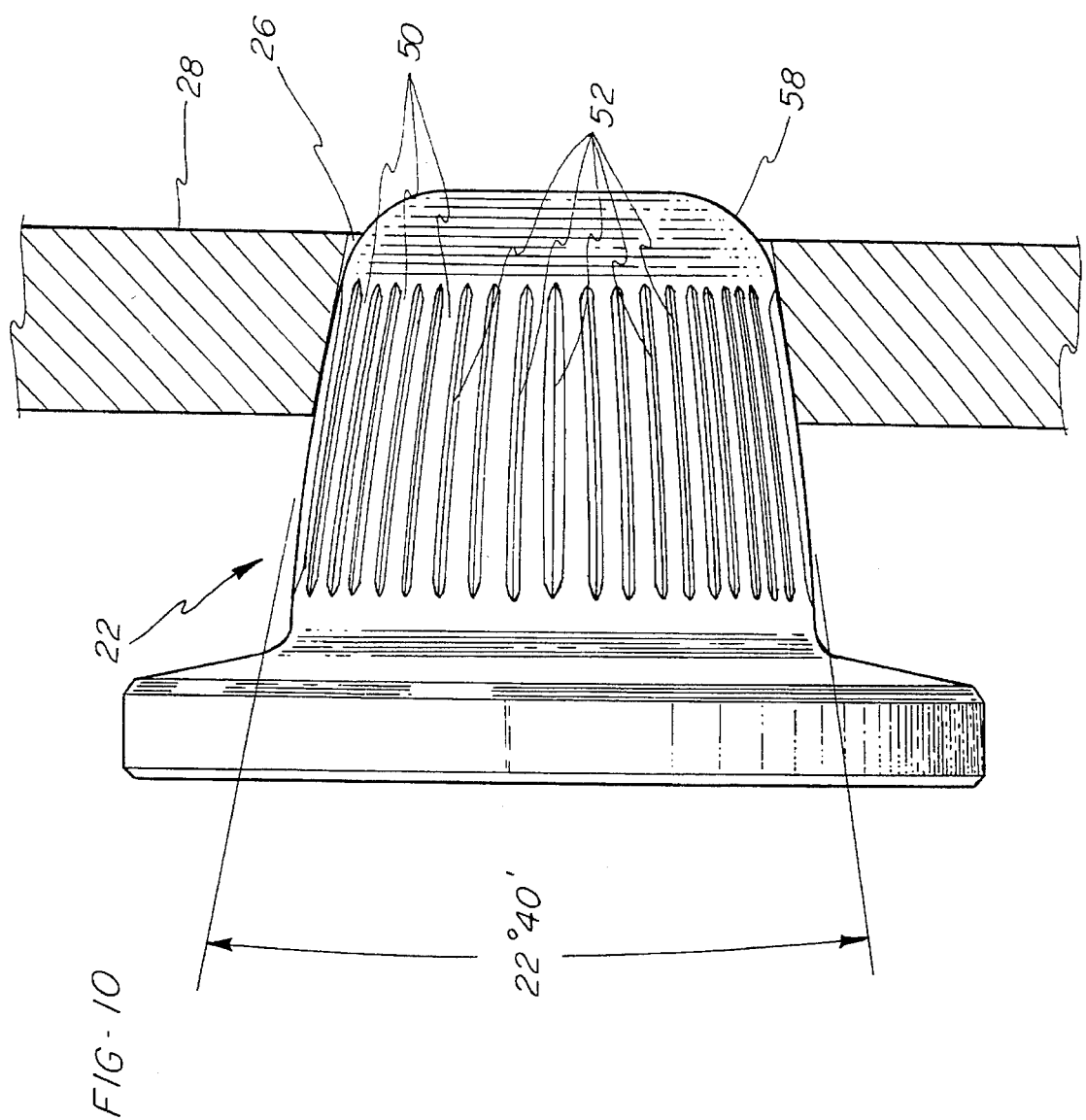

UNIVERSAL CYLINDER MOUNT FOR USE IN AN ENGRAVER

BACKGROUND OF THE INVENTION

1. Field of the Invention

This invention relates to an engraver, and more particularly, this invention relates to a universal cylinder mount for use on an engraver.

2. Description of Related Art

The engraving of a gravure cylinder involves using an electro-mechanical engraver. The engraver rotates a cylinder while actuating an electronically controlled cutting tool or stylus which cuts or engraves cells into the surface of the cylinder. The engraved cylinder is generally used in a gravure printing press for printing paper, plastic or other material. The engraved cylinder can be used to print newspapers, magazines, cloth and packaging materials for various products. It may also be used for printing of patterns on wall panelings and floor coverings.

The process of gravure printing is performed by applying ink to the surface of the engraved cylinder. Then the excess ink is wiped off of the surface with a blade, so that only the engraved cells in the surface of the cylinder contain ink. The ink is then transferred to the material being printed.

In order to obtain a high-quality print, it is necessary that the cells or lines be very accurately engraved on the outer surface of the cylinder. These cells are usually placed within one or two microns from each other. The depth of the engraved cells must also be accurately controlled in order to control the amount of ink transferred from the cylinder onto the printing material. The amount of ink transferred to the printing material determines the shade of the print, for example, the shade of grey used in black and white printing.

In order to accurately engrave a cylinder, the cylinder had to be accurately placed between the headstock and tailstock. The cylinders of the past were generally mounted on an engraver between a stationary headstock and a slidable tailstock. With shaftless cylinders the headstock and tailstock each comprised a cone or mount received within an aperture in respective ends of the cylinder. The apertures in the cylinder varied in size depending on the printing press and related cylinder geometry. Consequently, the headstock and tailstock of the engraver had to be fitted with a particular cone or mount to fit into the mounting apertures of each cylinder. These mounting apertures varied in size such that the cone or mount on the headstock and tailstock had to be changed every time a new cylinder was mounted on the engraver.

Therefore, there is a need for a universal cylinder mount for use on the headstock and tailstock of an engraver. Further, there is a need for a universal cylinder mount which is adapted to receive various sized mounting apertures in cylinders for easy mounting of various cylinders onto the engraver.

SUMMARY OF THE INVENTION

The present invention provides a universal cylinder mount for use in an engraver to mount a at least one of a plurality of cylinders between a headstock and a tailstock wherein the headstock and tailstock cooperate to rotatably support the cylinder at an engraving station of the engraver. Each of the cylinders include opposing ends having mounting apertures defined therein for receiving the universal cylinder mount.

In one aspect of the invention, the universal cylinder mount comprises support means for supporting a at least one of a plurality of cylinders, engagement means on the support means for engaging a mounting aperture on each of the at least one of a plurality of cylinders wherein at least one of the mounting apertures is different from the other of the mounting apertures.

In a further aspect of the invention, the support means comprises first and second spindles for rotatably mounting a at least one of a plurality of cylinders, and the engagement means comprises a plurality of engagement surfaces defined on each of the spindles. The engagement surfaces are defined by lands and grooves extending longitudinally along the length of the spindles for facilitating frictional engagement with the mounting apertures in the cylinders. In addition, the lands and grooves prevent any seizing action from occurring between the spindles and the mounting apertures, which has proven to be a problem with engagement surfaces of prior cylinder mounts.

In addition, the engagement surfaces defined by the lands and grooves curve in a longitudinal direction such that the angle of longitudinal tangent lines, defined as lines extending in the longitudinal direction and tangent to the lands, increases from one end of the spindle to the opposite end thereof. The configuration of the engagement surfaces on the spindles facilitates positive engagement with frustoconical surfaces forming cylinder mounting apertures wherein the configuration of the frustoconical surfaces may vary in both angular orientation and diameter from one cylinder to another such that the particular angle of engagement, as well as the diameter at which engagement occurs, may vary.

In yet a further aspect of the invention, the spindle is mounted for longitudinal movement relative to a base member supporting the spindle and a resilient biasing element is positioned between the spindle and the base member to bias the spindle outwardly. The resilient biasing element permits the spindle to apply a predetermined force for holding the cylinder in place.

Therefore, it is an object of the present invention to provide a universal cylinder mount for mounting different cylinders having different mounting apertures.

It is a further object of the present invention to provide such a universal cylinder mount for use in a head stock and tailstock of an engraver wherein the cylinder mount includes engaging surfaces for facilitating frictional engagement and alignment with the cylinder.

Other objects and advantages of the present invention will be apparent from the following description, the accompanying drawings, and the appended claims.

BRIEF DESCRIPTION OF THE DRAWINGS

FIG. 1 is a partially cut away elevational view showing a cylinder mounted in a gravure engraver incorporating the universal cylinder mount of the present invention;

FIG. 2 is a perspective view of an embodiment of the universal cylinder mount of the present invention which is adapted to be mounted on the headstock of an engraver;

FIG. 3 is an end view of the universal cylinder mount of FIG. 2;

FIG. 4 is a cross-sectional side elevational view of the universal cylinder mount of FIG. 2;

FIG. 5 is a perspective view of an embodiment of the universal cylinder mount of the present invention which is adapted to be mounted on the tailstock of an engraver;

FIG. 6 is an end view of the embodiment of FIG. 5;

FIG. 7 is a cross-sectional side elevational view of the embodiment of FIG. 5; and FIGS. 8–10 are elevational views in partial cross-section of the present invention engaged in mounting apertures of various cylinders.

DESCRIPTION OF THE PREFERRED EMBODIMENTS

Figure 8:
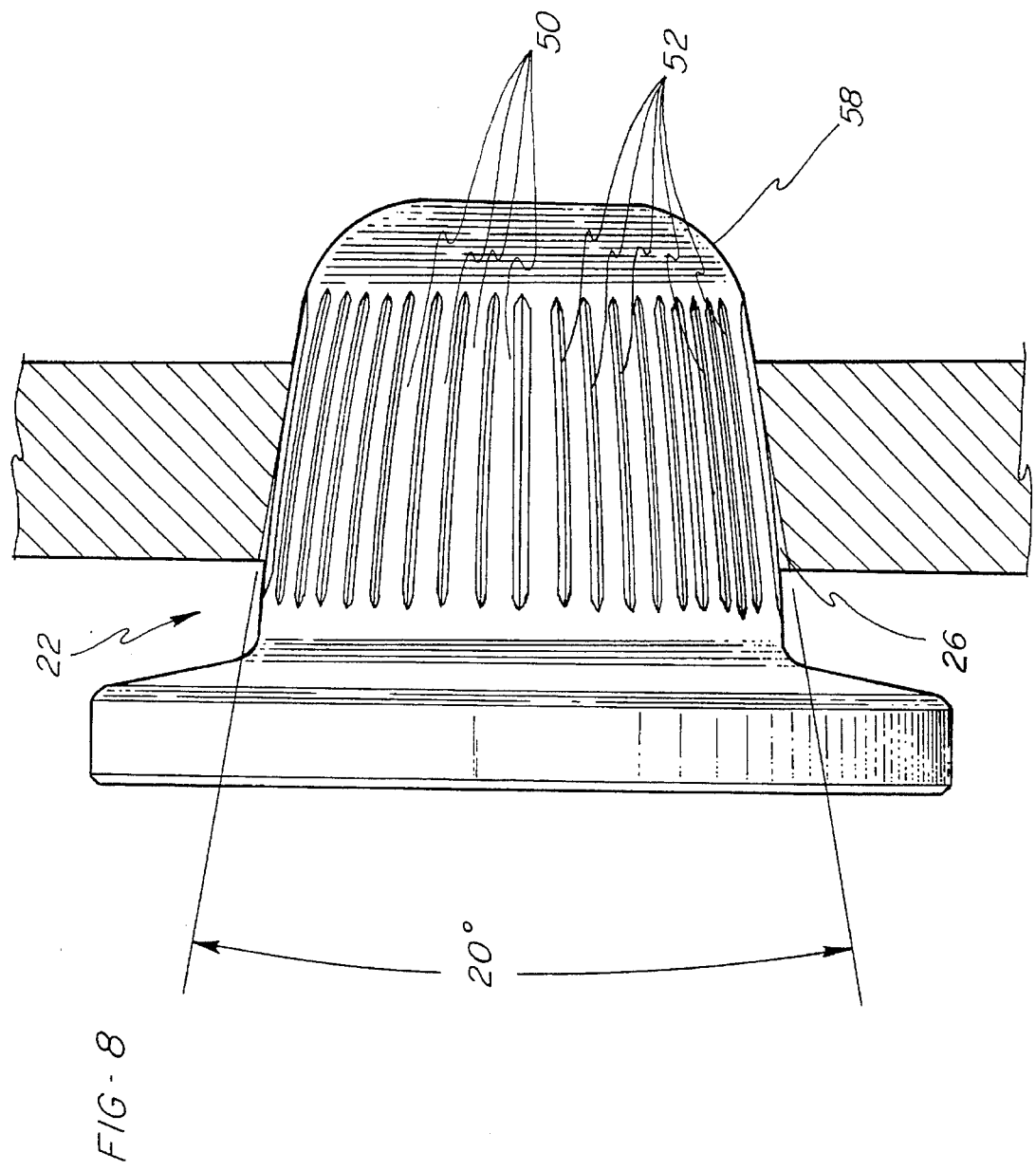

Referring to initially to FIG. 1, the universal cylinder mount of the present invention is shown in conjunction with a gravure engraver 10 having a headstock 12 and a tailstock 14. A plated cylinder 16 is shown mounted between the headstock 12 and tailstock 14 in an engraving station 18 of the engraver 10. In addition, an electronically controlled engraving head 20 is located in the engraving station 18 for engraving the cylinder 16. Although the present invention is described with reference to a gravure engraver, it should be understood that the universal cylinder mount of the present invention is adapted to be used for mounting cylinders in other applications as well, such as in a lathe, cylinder polishing machines or other apparatus for mounting rotatable work pieces.

The headstock 12 and tailstock 14 each carry a universal cylinder mount 22 and 24, respectively for frictional mating engagement within substantially identical mounting surfaces or mounting apertures 26 defined in opposing ends 28, 30 of the cylinder 16. In a typical cylinder mounting operation, the cylinder 16 is supported in the engraving station 18 by a temporary support (not shown) between the tailstock 12 and the tailstock 14, and the tailstock 14 is then moved into engagement with the end 30 of the cylinder causing the opposing end 28 to also move into engagement with the headstock 12. Alternatively, both the headstock 12 and the tailstock 14 may be mounted for simultaneous movement into engagement with the respective cylinder ends 28, 30. Thus, the engraver 10 is capable of accommodating cylinders 16 having varying lengths within the engraving station 18.

In addition, cylinders 16 provided to the engraving station 18 typically vary in diameter with resulting variations in the configuration of the mounting apertures 26. The universal cylinder mounts 22, 24 are particularly designed to accommodate these variations in aperture configuration, as will be described with specific reference to the cylinder mount 22, wherein the description is equally applicable to the opposing cylinder mount 24.

Referring to FIGS. 2–4, the universal cylinder mount 22 comprises a spindle assembly including a spindle 32 supported by a first shaft 34. It should be noted that the shaft 34 may comprise a drive shaft associated with the headstock 12 for driving the mounting head 22 in rotational movement about a longitudinal axis 36 of the spindle 32. The spindle may be attached to the base member or shaft 34 by any conventional means such as by a fastener 38 having a head portion positioned adjacent to a nose end 40 of the spindle 32 and a threaded shank portion 42 threadably engaged with the shaft 34 adjacent to a base end 44 of the spindle 32. Further, the spindle assembly includes a key 46 which is engaged in a groove formed on an inner surface of an aperture 48 for receiving the shaft 34 and in a groove formed in the outer surface of the shaft 34 whereby relative rotation between the shaft 34 and the spindle 32 is prevented.

The spindle 32 further comprises means defining engaging surfaces formed by alternating lands 50 and grooves 52.

The lands and grooves 50,52 extend in a longitudinal direction from the base end 44 to the nose end 40 and are substantially equally spaced circumferentially around the spindle 32. Further, the engagement surfaces formed by the lands 50 define a circumference of the spindle 32 which decreases in a direction from the base end 44 to the nose end 40. It should also be noted that the decrease in circumference is non-linear such that an angle defined, for example, by the longitudinal axis 36 and a longitudinal tangent line, as defined by a line extending in a direction from the base end 44 to the nose end 40 and tangent to the land surface 50, increases from the base end 44 to the nose end 40, as is illustrated by tangent lines 54, 56 which are tangent to the land surface 50 at points A and B, respectively.

The distinct land surfaces 50 separated by grooves 52 provide for positive frictional engagement between the spindle 32 and the surfaces defining the mounting apertures 26 in the cylinders 16 whereby relative rotation between cylinder mount 22 and the cylinder 16 is prevented. In addition, the grooves 52 provide a reduced circumferential contact area for engaging the apertures 26 to prevent any seizing action between the spindle 32 and the cylinder 16 whereby longitudinal movement of the spindle 32 into and out of engagement with the apertures 26 is facilitated.

Further, the curved, arcuate or progressively tapered configuration of the land surfaces 50 permit the spindle 32 to accommodate frustoconical mounting apertures 26 which have different diameters as well as different slopes or angles of inclination for the walls defining the apertures 26. As illustrated in FIG. 9, the mounting surfaces or mounting aperture 26 lies generally between a major diameter 57 and a minor diameter 55. The progressively tapered spindle 32 is particularly adapted to accommodate varying angles of inclination for the walls defining the apertures 26, as may be seen in a comparison of FIGS. 8 and 9 with FIG. 10. By providing a curved surface on the lands 50, a tangential contact area is formed between the spindle 32 and the surface of the aperture 26 to ensure proper alignment of the spindle 32 relative to the cylinder 16 and to facilitate frictional engagement with the cylinder 16. It should be noted that the means or engaging surfaces may be arcuately shaped relative to the axis of rotation of cylinder mount 24. The alignment of plated cylinder 16 within the engraver 10 during an engraving process is critical in that the precision of the engraving process depends on the ability to accurately and predictably control the relative position between the cylinder 16 and the engraving head 20.

FIGS. 8–10 further illustrate that the spindle 32 is adapted to accommodate different diameter mounting apertures 26 in that the spindle 32 will simply extend further into a large diameter mounting aperture 26, as illustrated in FIG. 8, in comparison with a smaller diameter aperture illustrated in FIG. 9. It should also be noted that the leading or nose end 40 of the spindle is provided with an increased taper in the area 58 in front of the lands and grooves 50, 52 in order to insure proper alignment of the spindle 32 as it initially passes into a cylinder mounting aperture 26.

Referring to FIGS. 5–7, the universal cylinder mount 24 for the tailstock 14 is illustrated wherein elements similar to the universal cylinder mount 22 for the headstock 12 are labeled with the same numeral increased by 100. The universal cylinder mount 24 includes a spindle 132 which cooperates with a base member 160, and the spindle 132 and base member 160 define a spindle assembly which is mounted to and supported by a shaft 134 whereby the spindle assembly is attached to the tailstock 14.

As in the universal cylinder mount 22, the spindle 132 is held in place relative to the shaft 134 by means of a fastener 138 having a threaded shank 142 which is threadably engaged in the shaft 134 adjacent to a base end 144 of the spindle 132. In addition, a spacer 162 is positioned sandwiched between a head of the fastener 138 and a front surface 164 of the base member 160. The spacer 162 includes a head portion 166 and a space is defined between the head portion 166 and the front surface 164 of the base member 160 for receiving an inwardly extending flange 168 of the spindle 132. The spindle 132 is mounted for longitudinal movement within the confines of the space defined between the spacer head portion 166 and the front surface 164. In addition, the spindle 132 is guided in its longitudinal movement by a shank 170 of the base portion 160 which receives a central aperture 172 of the spindle 132.

The spindle assembly is also preferably provided with a plurality of guide pins 174 which are mounted into the base member 160 and slidably received within apertures 176 formed in the spindle 132. The pins 174 prevent relative rotational movement between the spindle 132 and the base member 160. Further, the base member 160 includes a plurality of additional apertures 178 wherein each aperture 178 receives a resilient biasing member 180 which acts as a spring to bias the spindle 132 outwardly away from the base member 160 to a position where the flange 168 engages against the head portion 166 of the spacer 162. The biasing elements 180 are preferably composite urethane springs which provide a predetermined force against the spindle 132 whereby the force applied by the spindle 132 against the end of a cylinder may be controlled.

The exterior of the spindle 132 is formed in a manner substantially identical to the opposing spindle 32 in that lands 150 and grooves 152 are provided in the exterior surface in order to facilitate alignment and positive engagement with apertures 26 defined in the cylinder 16. In addition, the lands 150 are formed with curved or progressively tapering surfaces as in the surfaces 50 of the spindle 32 in order to facilitate engagement of apertures 26 having different diameters as well as apertures 26 having different frustoconical walls defining different slopes or angles for different cylinders.

It should also be noted that the shank 170 of the base member 160 is provided with a spiral lubricating channel 182 for containing a lubricant to lubricate the contact surfaces between the shank 170 and the central aperture 172 of the spindle 132. In this manner, the longitudinal movement of the spindle 132 relative to the base member 160 is lubricated.

It should be apparent that as the universal cylinder mount 24 is brought into engagement with a cylinder 16, the biasing element 180 acts to insure that a predetermined force is applied against the cylinder to provide a uniform clamping pressure for supporting the cylinder. It should also be apparent that the universal cylinder mount 24 acts to positively bias the cylinder 16 towards the headstock 12, thereby enabling the headstock 12 to drive the cylinder 16. The cylinder mount 24 further promotes positive cylinder engagement during any small relative lateral movement of the headstock 12 or tailstock 14.

In addition, it should also be noted that although the present invention is described with the universal cylinder mount 22 located at the headstock 12 and the resiliently biased universal cylinder mount 24 located at the tailstock 14, resiliently biased cylinder mounts similar to the mount 24 may be provided at both the headstock 12 and the tailstock 14 to provide a desired mounting force against the cylinder ends. Conversely, both the headstock 12 and tailstock 14 could have a fixed non-resilient mount 22.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A universal cylinder mount comprising a base end, a nose end, and an axis of rotation, said universal cylinder mount comprising:

support means for supporting any one of a plurality of cylinders; and engagement means on said support means for engaging a mounting aperture on said any one of said plurality of cylinders;

said engagement means having an arcuately shaped surface wherein an associated angle is defined between said axis of rotation and a tangent line, to said arcuately shaped surface said angle increases when moving along said surface from said base end to said nose end.

2. The universal cylinder mount as in claim 1, wherein said support means comprises rotatable spindle means having a base end and a nose end, and the circumference of said spindle means decreases in a direction from said base end to said nose end.

3. The universal cylinder mount as in claim 2, wherein said angle, defined by said axis of rotation and a line tangent to said engagement means increases non-linearly from said base end to said nose end.

4. The universal cylinder mount as in claim 1, wherein said support means comprises rotatable spindle means having said base end and said nose end and said engagement means comprises means for aligning and increasing frictional engagement with said mounting aperture.

5. The universal cylinder mount as in claim 4, wherein said means for aligning and increasing frictional engagement comprises land means extending in a longitudinal direction from said base end to said nose end.

6. The universal cylinder mount as in claim 5, wherein the angle defined by said axis of rotation and a like tangent to said engagement means, increases at an increasing rate from said base end to said nose end.

7. The universal cylinder mount as in claim 1, including force means for maintaining a predetermined force on said support means to bias said engagement means into engagement with said mounting aperture with a predetermined force.

8. The universal cylinder mount as in claim 7, including base means supporting said support means, said support means being movable in a longitudinal direction relative to said base means, and said force means for maintaining said predetermined force comprises resilient means acting between said support means and said base means.

9. A universal cylinder mount, comprising:

a rotatable spindle comprising a base and a nose for supporting one of a plurality of cylinders;

a plurality of engagement surfaces on said spindle for engaging a mounting aperture of said one of said plurality of cylinders; and at least one of said plurality of engagement surfaces being arcuately shaped wherein an associated angle is defined between an axis of said rotatable spindle and a tangent line, to said arcuately shaped surface whereby said angle increases when moving along said surface from said base and said nose.

10. The universal cylinder mount as in claim 9, wherein a circumference of said rotatable spindle decreases non-linearly in a direction from said base to said nose.

11. The universal cylinder mount as in claim 10, wherein the angle defined by an axis line of said spindle and a line tangent to said one of said plurality of engagement surfaces, increases from said base to said nose.

12. The universal cylinder mount as in claim 9, wherein said engagement surfaces comprise a plurality of lands extending in a longitudinal direction from said base to said nose.

13. The universal cylinder mount as in claim 12, wherein the associated angle, defined by an axis of said rotatable spindle and a line which is tangent to one of said plurality of lands, increases at an increasing rate from said base to said nose.

14. The universal cylinder mount as in claim 9, including a biasing member for maintaining a predetermined force to bias said engagement surfaces into engagement with said mounting aperture with a predetermined force.

15. The universal cylinder mount as in claim 14, including a base member supporting said spindle, said spindle being movable in a longitudinal direction relative to said base, and said biasing member comprising a resilient spring element acting between said spindle and said base member.

16. A universal cylinder mount for use in an engraver to mount one of a plurality of cylinders at an engraving station of said engraver, each said cylinder having frustoconical mounting surface at each end thereof, said universal cylinder mount comprising:

a first spindle assembly including a first spindle supported on said headstock;

a second spindle assembly including a second spindle and a cooperating base member supporting said second spindle on said tailstock;

a frictional engagement surface located on each of said first and second spindle assemblies; and said frictional engagement surface being generally arcuately shaped said first and second spindles each having a base and a nose, said frictional engagement surface comprising an associated angle defined by a rotation axis of said spindle and a tangent line, to said arcurated shaped surface said associated angle increases when moving along said surface from said base to said nose, 17. The universal cylinder mount as in claim 16, wherein said frictional engagement surfaces are defined by alternating lands and grooves extending longitudinally along said first and second spindle assemblies.

18. The universal cylinder mount as in claim 16, wherein said second spindle is mounted for longitudinal movement relative to said second base member, and including a resilient biasing element for biasing said second spindle outwardly from said second base member.

19. The universal cylinder mount as in claim 18, including a lubricating channel formed in an outer surface of said second base member.

20. The universal cylinder mount as in claim 18, including alignment pins extending between said second base member and said second spindle to prevent relative rotation between said second base member and said second spindle.

21. The universal cylinder mount as in claim 16, including a first shaft engaging said first base member for mounting said first spindle assembly to said headstock, and a second shaft engaging said second base member for mounting said second spindle assembly to said tailstock.

22. A method of mounting one of a plurality of cylinders comprising the steps of:

providing a support for engaging a mounting surface in said one of said plurality of cylinders, said support having a generally arcuately shaped surface, wherein an associated angle is defined by an axis of rotation of said support and a tangent line, to said arcuately shaped surface said angle increases when moving along said surface from a base of said support to a nose of said support; and moving said support into engagement with said mounting surface of said one of said plurality of cylinders.

23. The method as in claim 22, wherein said one of said plurality of cylinders comprises a second mounting surface having a diameter which is different than a diameter of said second mounting surface.

24. The method as in claim 22, wherein said mounting surface are generally frustoconical and comprises a plurality of different arcuate shapes.

25. The method as in claim 22, wherein said support comprises first and second spindles for supporting a cylinder within the engraver.

26. The method as in claim 22, wherein said at least one mounting surface engages a different portion of said support than a second mounting surface of another of said plurality of cylinders.

27. The method as in claim 22, wherein said support includes a spindle supported on a base member and said step of moving said support into engagement includes said spindle moving toward said base member to compress a resilient member and maintain a predetermined force on said cylinder.

28. The method as in claim 22, further comprising the step of:

biasing said support against said mounting aperture with a predetermined force.

29. The method as in claim 22, further comprising the step of:

providing a plurality of lands on said support.

30. The method as in claim 22, further comprising the step of:

providing a support comprising an arcuate frictional engagement surface.

31. An engraver comprising:

a headstock;

a tailstock for cooperating with said headstock to rotatably supporting one of a plurality of cylinders where each of said plurality of cylinders comprises a first end and a second end;

an engraving device for engraving said one of said plurality of cylinders;

a first cylinder mount associated with said headstock; and a second cylinder mount associated with said tailstock, said first and second cylinder mounts being capable of engaging said cylinder to rotatably support said cylinder between said headstock and said tailstock;

each of said first and second cylinder mounts comprising on arcuately shaped mounting surface;

said arcuately shaped mounting surface of either said first cylinder mount or said second cylinder mount comprising an associated angle which is defined by an axis of rotation of said cylinder mount and a tangent line which is tangent to said arcuately shaped surface, where said associated angle increases when moving along said surface from a base of said cylinder mount to a nose of said cylinder mount.

32. The engraver as recited in claim 31 wherein said mounting surface is linearly tapered.

33. The engraver as recited in claim 31 wherein said first and second cylinder mounts each comprise an engagement surface which is generally arcuately shaped.

34. The engraver as recited in claim 31 wherein said first and second cylinder mounts each comprise a plurality of lands.

35. The engraver as recited in claim 34 wherein said plurality of lands are arcuately shaped.

36. The engraver as recited in claim 35 wherein said plurality of lands are defined by a plurality of grooves.

37. The engraver as recited in claim 31 wherein said plurality of cylinders comprises a first cylinder having a first working surface defining a first taper and a second cylinder having a second working surface defining a second taper which is different from said first taper.

\* \* \* \* \*